CONTROL MEANS FOR TRANSISTOR OSCILLATORS

Filed March 6, 1957 2 Sheets-Sheet 1

INVENTOR.
Donald D. Grieg
BY
Albert Sperry
ATTORNEY

Nov. 8, 1960 D. D. GRIEG 2,959,745

CONTROL MEANS FOR TRANSISTOR OSCILLATORS

Filed March 6, 1957 2 Sheets-Sheet 2

INVENTOR.
Donald D. Grieg
BY
Albert Sperry
ATTORNEY

United States Patent Office 2,959,745

Patented Nov. 8, 1960

2,959,745

CONTROL MEANS FOR TRANSISTOR OSCILLATORS

Donald D. Grieg, Grandview Ave., North Caldwell, N.J.

Filed Mar. 6, 1957, Ser. No. 644,240

4 Claims. (Cl. 331—113)

This invention relates to the regulation and control of transistor oscillators and is directed particularly to systems whereby the output of a transistor oscillator may be maintained substantially constant.

Transistor oscillators are subject to wide variations in output voltage due to change in the input voltage or upon change in the load in the output circuit. The frequency of the output current also may be varied by such changes.

A measure of control can be effected by regulating the source of direct current supplied to the oscillator in response to variation in the output voltage. When a constant output voltage is required under changing load, a portion of the output current is sometimes fed back to the direct current source. However, since the direct current is usually supplied to the oscillator at low voltages, the current requirements of such regulating systems are often so high as to render this system of control impractical. Furthermore, the high current requirements of such methods of control materially reduce the overall efficiency of the system by reducing the useful output current available from the oscillator. Moreover, the circuits required in effecting such regulation are frequently complicated and in most instances, it is necessary to start with a higher battery voltage than normally required in order to allow for the voltage drop across the regulator system.

In accordance with the present invention, these objections and limitations of prior art regulators for transistor oscillators are overcome and a system provided wherein the voltage and frequency of the output current can be maintained more nearly constant under varying conditions of usage.

These results are preferably attained by providing a transistor oscillator circuit with control means including a transistor located between the direct current input circuit to the oscillator and the base of a transistor in the oscillator circuit and varying the effective resistance of the transistor in the control means upon change in a characteristic of either the input or output current of the oscillator. In one form of the invention there is provided a feed-back from the output circuit to the base of a transistor in the oscillator and the voltage of such feed-back is varied in response to changes in the condition to be controlled. With this arrangement, a change in the voltage of direct current to the oscillator is compensated for by a feed-back from the output circuit which serves to restore the input voltage to that originally established for operation. In a similar way, the frequency of the output current can be controlled whereas changes in load on the output circuit are utilized to vary the gain of the oscillator system to compensate for the load change.

The principal object of the invention is to regulate or control the operation of a transistor oscillator to maintain the characteristics of the output current substantially constant under varying conditions of usage.

Another object of the invention is to maintain the output from a transistor oscillator substantially uniform with changes either in the input voltage or the load on the output circuit, or both.

A specific object of the invention is to control the operation of a transistor oscillator by direct feed-back to the base of a transistor in the oscillator from the output circuit.

These and other objects and features of the present invention will appear from the following description thereof wherein reference is made to typical circuit arrangements shown in the accompanying drawing.

Figure 1:
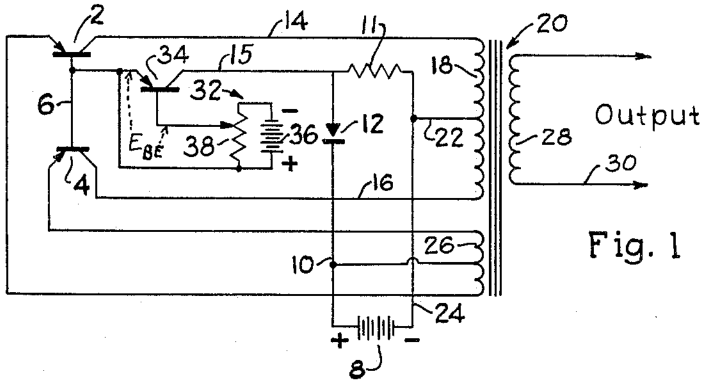
Fig. 1 is a wiring diagram illustrating a simplified form of circuit embodying the present invention.

For purposes of illustrating the operation and characteristics of circuits embodying the present invention, the control system is shown as applied to a converter or inverter of the type shown and described in copending application Serial No. 637,832.

In systems of this character a transistor oscillator, which preferably embodies two transistors 2 and 4 arranged in push-pull relation, is provided with a common base connection 6. The bases are given a negative bias from a direct current source 8 through the line 24, resistor 11 and the transistor 34 of a control unit 32. The negative side of a diode 12 in the positive line 10 from direct current source 8 is connected to the line 15 which extends from resistor 11 to the transistor 34 and serves as a voltage divider. The collectors of the transistors 2 and 4 are connected by the conductors 14 and 16 to the opposite ends of the primary winding 18 of a transformer 20 and are given a negative bias by a connection 22 extending from the negative line 24 of the direct current source to the mid point of the winding 18. The emitters of the transistors 2 and 4 are given a positive bias by the connection 25 which extends from the positive line 10 of the direct current source to the mid-point of a feed-back winding 26. The windings are supplied with alternating current of opposite polarity and phase from the feed-back winding 26 since this winding is coupled with the secondary winding 28 of transformer 20. The secondary winding is included in the load circuit 30 and may be connected in series with the secondary windings of other or satellite units controlled from the feed-back winding of a master unit, or otherwise, as described in said copending application.

In order to control such a system so as to insure uniform characteristics in the output current, the common base connection 6 for the transistors 2 and 4 is provided with a control unit indicated generally at 32. As shown, the unit 32 includes the transistor 34 in the line 15 between the resistor 11 and the common base connection 6 of the transistor oscillator. The collector of transistor 34 is connected to line 15 while the emitter of the transistor is connected to the common base connection 6 of the transistors 2 and 4 of the oscillator. The emitter of transistor 34 and the common base connection 6 are further connected to the positive side of a source of potential such as the battery 36, whereas the base of transistor 34 is connected to the negative pole of battery 36 through adjustable resistance 38. The resistance 38 is adjusted to vary the potential between the emitter and base of transistor 34 and variation of this potential alters the current flow through transistor 34 and the effective resistance thereof. In this way, changes in adjustable resistance 38 serve to alter the amount of resistance inserted in the base return lead from the negative line 24 of the direct current source 8 to the common base 6 of the transistors of the oscillator. The resistance of the transistor 34 is sensitive to the potential E*be* of the emitter and base, and accordingly, can be varied by a change in the amount of the variable resistance 38 included in the circuit.

Figure 2:
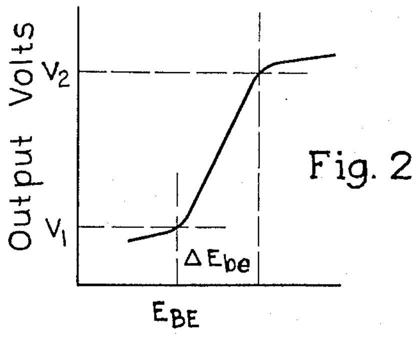
Fig. 2 is a curve indicating one characteristic of the circuit shown in Fig. 1 which may be utilized in controlling an oscillator.

As illustrated in the voltage graph of Fig. 2, a small change ΔE*be* will result in a relatively large change in the effective resistance of transistor 34 and a corresponding large change in the voltage V1—V2 appears across winding 28. Accordingly, if the voltage of the direct current source 8 should be reduced, the value of the resistance 38 may be changed to decrease the difference in potential E*be* and decrease the output of transistor 34 to compensate for the reduction in voltage of the direct current source 8. Conversely, if the voltage of direct current source 8 should increase, the value of resistance 38 may be changed to increase the potential E*be* whereby the output of transistor 34 will be increased in an amount sufficient to compensate for the increase in voltage of the direct current source.

In a typical case, a change of 0.1 volt in the difference of the potential of the emitter and base of the transistor 34 will result in a change of 100 volts in oscillator output. The control unit 32 therefore is extremely sensitive and adjustable resistance 38 can be readily varied to maintain the voltage impressed on the common base connection 6 of the oscillator substantially constant over a wide range in variations in the voltage of the direct current input. The resistance 38 may be adjusted manually or in any other suitable way so that the voltage of the output from the oscillator to the load circuit 30 will be constant despite variations in the voltage of the direct current source 8. Moreover, the current requirements of the compensating unit 32 are very limited and may generally be satisfied by a small battery without imposing any load on the load circuit 30.

Figure 3:
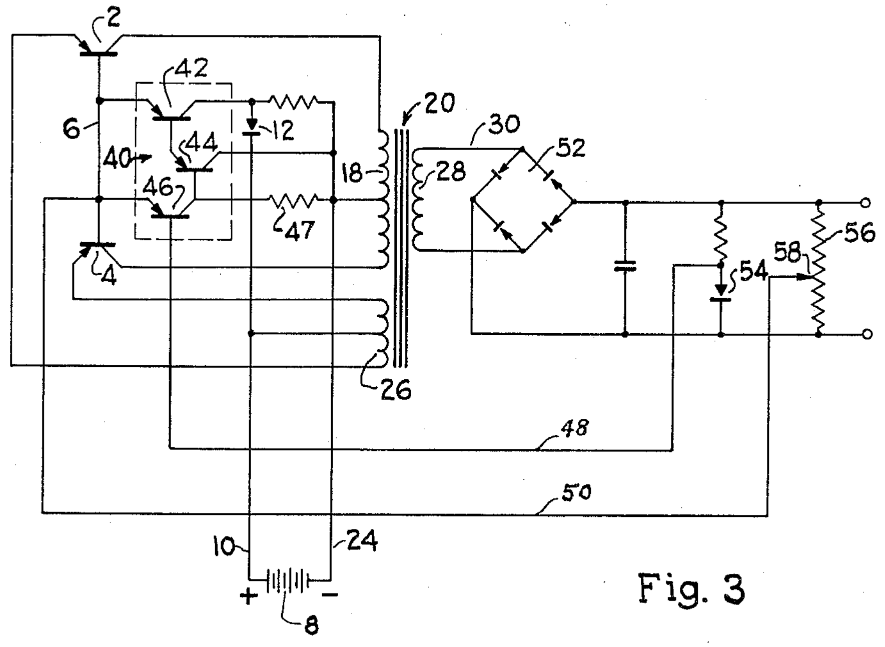
Fig. 3 illustrates an alternative circuit wherein a transistor oscillator is controlled to maintain a constant output voltage in accordance with the present invention.

In the alternative and in a more complete system, the arrangement shown in Fig. 3 may be employed to effect an automatic control of the system. With this arrangement, compensation for variations in either the load circuit voltage or the direct current input voltage, or both, may be effected. As shown, the control unit is indicated generally at 40 and includes three transistors 42, 44 and 46. The emitter of the transistor 42 is connected to the common base connection 6 of the oscillator, whereas the collector of transistor 42 is connected to the positive line 10 of the direct current input source 8. The base of transistor 42 is connected to the emitter of transistor 44 while the collector of the latter transistor is connected to the negative line 24 of the direct current source 8. A resistance 47 serves to establish a predetermined bias between the base of transistor 44 and the collector thereof. However, the base of transistor 44 is also connected to the collector of transistor 46.

The emitter of transistor 46 is connected to the common base connection 6 of the oscillator but the emitter and base of transistor 46 are also connected to a control or feed-back circuit supplied from the load circuit through the conductors 48 and 50 respectively. Such a feed-back circuit serves to supply direct current of the proper voltage to the compensating unit 40, thereby rendering it unnecessary to use a separate direct current source such as that shown as a battery 36 in the circuit of Fig. 1. In this way the operation of the oscillator is controlled in direct response to change in the characteristics of the output current.

In the preferred assembly illustrated, the feed-back circuit is supplied with direct current from the load circuit 30 through the rectifier network 52. A zener diode 54 or other reference potential means, and a potentiometer 56 are connected in parallel across the load circuit so as to provide a comparison circuit which will be responsive to any deviations in voltage of the output from a predetermined value or norm. The constant voltage developed across the diode 54, by reason of its inherent characteristics, is thereby compared with the voltage developed across the active portion of the potentiometer 56. Adjustment of the contact 58 connected to conductor 50 will serve to establish the predetermined voltage drop in the current flowing through the potentiometer and the net difference in voltage developed across the diode 54 and the active portion of potentiometer 56 will be thus applied to the base and emitter of the transistor 46.

Thus, for example, a decrease in the direct current input voltage to the oscillator from the source 8, or an increase in the current drawn from the oscillator through the load circuit 30, will tend to decrease the output voltage across the diode 54 and the potentiometer 56. This decrease in voltage will serve to produce a change in voltage or polarity of the conductors 48 and 50 which in turn will be amplified by the transistors 44 and 46. The net potential difference which will then be developed across the base and emitter of transistor 42 will cause additional current to flow through the emitter collector circuit decreasing the resistance thereof. As a result, the potential of the common base connection 6 of the oscillator will be increased and the voltage of the output current from the oscillator will be correspondingly increased in accordance with the curve of Fig. 2.

Any combination of input voltage change and load change which tends to produce an increase in voltage of the load circuit will result in a reversal of the polarity of the current supplied by the feed-back system to transistor 46 and result in a compensating decrease in the voltage of the output current.

Equilibrium will be established only when the voltage drop across the active portion of the potentiometer 56 just equals that across the zener diode 54. This point of equilibrium can be obtained over a wide range of output voltages by suitable adjustment of the potentiometer 56 and as a result, effective control can be maintained under substantially any operating conditions desired.

Figure 4:
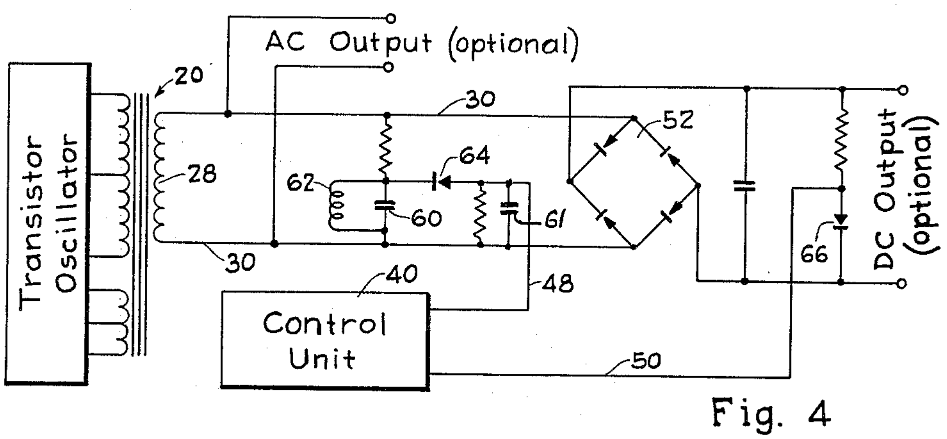
Fig. 4 is a diagram of a circuit which may be employed in controlling the frequency of the output current in accordance with the present invention.

As shown in Fig. 4, systems embodying the present invention can also be used to compensate for changes in frequency of the output current from the oscillator. For this purpose, a control unit 40, similar to that of Fig. 3, is employed whereas a frequency discriminator, in the form of a tuned circuit including the condenser 60 and impedance 62, is connected across the load circuit 30 in advance of the rectifier network 52. The discriminator is tuned to provide maximum amplified output for a predetermined frequency corresponding to that desired in the output from the transistors 2 and 4 of the oscillator. The alternating current signal from the resonant circuit is impressed on a diode rectifier 64 connected to line 48 leading to the base of transistor 46 of the control device 40. The diode rectifier converts the alternating current signal to a direct current signal having a potential directly proportional to the amplitude of the alternating current signal received from the tuned circuit of the frequency discriminator. The condenser 61 may be provided to filter out any alternating current component from the direct current thus used in controlling the compensating feed-back current. As a result, deviations in the frequency of the current in the load line 30 from that for which the discriminator has been adjusted will appear as differences in potential impressed on the feed-back lines 48 and 50 leading to the base of transistor 46 of control device 40.

A constant voltage device such as a zener diode 66 is connected across the load circuit 30 and to line 50 leading to the emitter of the transistor 46 in the control device 40. The voltage of the signal from the frequency discriminator is thus compared to the constant voltage from the zener diode 66 whereby the bias or polarity of the base and emitter of transistor 46 will vary with the frequency of the output current in load circuit 30.

Figure 5:
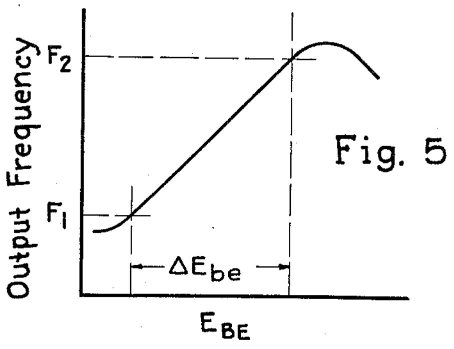
Fig. 5 is a curve illustrating a characteristic of the circuit shown in Fig. 4 which is utilized in effecting control thereof.

As shown in Fig. 5, a change in the voltage across the base and emitter of the transistor 42 of control device 40 will result in a corresponding change in the frequency of the output current from the transistors 2 and 4 of the oscillator. Such a change in voltage of the base and emitter of transistor 46 under control of the frequency discriminator will produce a compensating change in voltage across the emitter and base of transistor 42 to restore the frequency of the output current of the oscillator to that at which the tuned circuit of the discriminator is resonant.

It will be apparent from the foregoing description of the operation of the circuits shown in Figs. 3 and 4 that the output current from a transistor oscillator may be maintained constant in both voltage and frequency. Thus two comparison circuits may be employed in the same system with one circuit arranged to respond to changes in voltage as shown in Fig. 3, and the other arranged to respond to changes in frequency as shown in Fig. 4. The control effects obtained when using two such comparison circuits are combined to establish the desired overall control of the system. By adding the two responses algebraically either a maximum or a zero voltage may be applied to the emitter and base of the transistor 46 of the control unit 40. In this way variation in either the voltage or the frequency of the output current from the oscillator will give rise to a compensating voltage change for actuating the unit 40 to restore the voltage or frequency or both to that for which the system has been originally adjusted.

Figure 6:
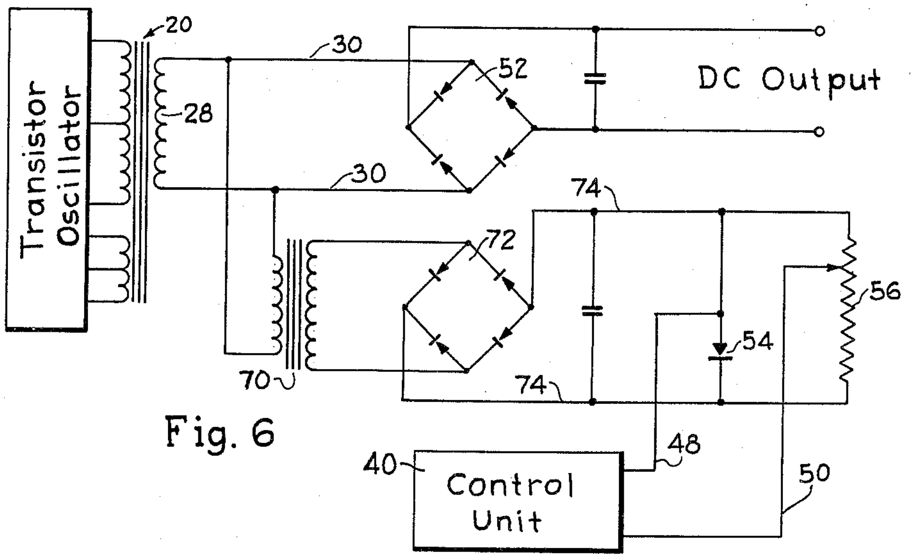
Fig. 6 illustrates an alternative type of control means which may be employed in the practice of the present invention.

The circuit illustrated in Fig. 6 is typical of those in which the regulation is effected by control means isolated completely from the direct current input circuit. As shown, a portion of the alternating current output from load circuit 30 is supplied to a separate isolating transformer 70 and a rectifier network 72. Both the reference voltage impressed on the output lines 74 from the rectifier network and the control voltage impressed on the lines 48 and 50 leading to control unit 40 are thus obtained from the output of the isolating transformer 70. The net difference in these voltages is utilized in affecting control of the oscillator in the manner previously described.

By employing circuits of this character, it is not only possible to eliminate influences of the constant voltage source on the control system, but is also possible to operate the control system at any convenient reference voltage independent of the actual output voltage of the oscillator or the voltage value of the load circuit 30. Moreover, the system minimizes the need for changes in the zener diode or other reference potential means and simplifies adjustments in the values of the voltage and frequency maintained in the output circuit.

Instead of using comparison circuits of the types shown in Figs. 3 and 4, it is, of course, possible to use substantially any other arrangement or type of comparison means to provide a proportional direct current signal to be supplied to the control unit 40 in response to deviation of the output voltage or frequency from a predetermined value or norm desired or established by adjustment of the elements of the system. Such adjustments may be effected by selection or control of the elements in the reference voltage combination as by selection of a zener diode of predetermined value or by selection and adjustment in the settings of the potentiometer 56 or the tuned circuit of the frequency discriminator.

It will also be evident that the type of transistor oscillator assembly employed may be varied as desired. Furthermore, while the use of P–N–P transistors has been illustrated, N–P–N or other types of transistors may be utilized with equal effectiveness. Thus an open ended oscillator circuit or any other form of transistor oscillator may be used and controlled as herein described. Moreover, while the invention has been described and illustrated as applied to power systems of the type shown in the above identified copending application, it may obviously be employed in substantially any other type of transistor oscillator or power system as desired.

The invention is thus capable of numerous variations and modifications and is of wide application in the control of the characteristics of the current output of transistor oscillators and other equipment. In view thereof, it should be understood that the particular embodiments of the invention shown in the drawings and described above should be understood to be illustrative only and as representing typical applications of the invention without intending to limit the scope of the invention.

I claim:

1. In combination; a first and second transistor each having base, emitter and collector terminals, an output transformer having a first, second and third winding, an output circuit, a source of D.-C. voltage and a control transistor having base, emitter and collector terminals; said base terminals of said first and second transistors being connected to one another; said first transistor collector being connected to one end of said first winding; said second transistor collector being connected to the opposite end of said first winding; said first transistor emitter being connected to one end of said second winding; said second transistor emitter being connected to the opposite end of said second winding; the collector emitter circuit of said control transistor having one terminal connected to said base terminals of said first and second transistors; the other terminal of said collector emitter circuit of said control transistor being connected in series with said source of D.-C. voltage and a center tap of said first winding; the base emitter circuits of said first and second transistors being each connected in series with said emitter collector circuit of said control transistor, said source of D.-C. voltage, and terminating on a center tap on said second winding; said output circuit being connected to said third winding; said output circuit including error signal generating circuit means; said error signal generating circuit means being connected to the base-emitter circuit of said control transistor to control the conductivity of said emitter collector circuit of said control transistor in accordance with the magnitude of said error signal.

2. The device substantially as set forth in claim 1, wherein said error signal generating circuit means includes rectifier means connected to rectify the output voltage of said output circuit, a zener diode connected in parallel with said rectifier means, and a potentiometer connected in parallel with said zener diode; the difference in voltage across said zener diode and said potentiometer means comprising said error signal.

3. The device substantially as set forth in claim 1 wherein said error signal generating circuit means includes a tuned circuit connected across said output circuit, and means for deriving a reference voltage from said tuned circuit, a rectifier connected to rectify the output of said output circuit. and a zener diode in parallel with said rectifier; the difference between said reference voltage and the voltage on said zener diode comprising said error signal.

4. The device substantially as set forth in claim 1 including a transistor amplifier circuit having an input circuit and an output circuit; said error signal generating circuit means being connected to the said input circuit of said transistor amplifier; said output circuit of said transistor amplifier being connected to the base-emitter circuit of said control transistor.

References Cited in the file of this patent

UNITED STATES PATENTS

| | | |
|---|---|---|
| 2,138,138 | Bruckner | Nov. 29, 1939 |
| 2,389,992 | Mayle | Nov. 27, 1945 |
| 2,531,301 | Scholten | Nov. 21, 1950 |
| 2,693,568 | Chase | Nov. 2, 1954 |
| 2,751,549 | Chase | June 19, 1956 |
| 2,751,550 | Chase | June 19, 1956 |
| 2,776,382 | Jensen | Jan. 1, 1957 |
| 2,783,380 | Bonn | Feb. 26, 1957 |
| 2,784,367 | Van de Polder | Mar. 5, 1957 |
| 2,791,739 | Light | May 7, 1957 |
| 2,811,642 | Gabor | Oct. 29, 1957 |
| 2,824,276 | Stump | Feb. 18, 1958 |
| 2,848,610 | Freienmuth | Aug. 19, 1958 |
| 2,854,614 | Light | Sept. 30, 1958 |

OTHER REFERENCES

An Amplitude Stabilized Transistor Oscillator by Kretzmer in Proc. IRE, February 1954, pp. 391–401.